(12) United States Patent
Hayes et al.

(10) Patent No.: US 9,752,626 B2
(45) Date of Patent: Sep. 5, 2017

(54) AUTOMOTIVE DRIVELINE COMPONENT WITH SHIPPING CAP

(71) Applicant: GKN Driveline North America, Inc., Auburn Hills, MI (US)

(72) Inventors: Melissa L. Hayes, Waterford, MI (US); Jason F. Bock, Sterling Heights, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 264 days.

(21) Appl. No.: 14/829,823

(22) Filed: Aug. 19, 2015

(65) Prior Publication Data

US 2017/0051795 A1    Feb. 23, 2017

(51) Int. Cl.
  *F16D 23/00* (2006.01)
  *F16H 57/00* (2012.01)
(52) U.S. Cl.
  CPC ............. *F16D 23/00* (2013.01); *F16H 57/00* (2013.01); *F16D 2300/26* (2013.01); *F16H 2057/0093* (2013.01)

(58) Field of Classification Search
  CPC ................... F16D 2300/26; F16H 2057/0093
  See application file for complete search history.

(56) References Cited

U.S. PATENT DOCUMENTS 3,786,954 A    1/1974   Shull
2009/0295147 A1  12/2009  London et al.

FOREIGN PATENT DOCUMENTS

JP    2003072790    3/2003
JP    2010144841    7/2010

*Primary Examiner* — Jacob S Scott
(74) *Attorney, Agent, or Firm* — Jennifer M. Brumbaugh; Reising Ethington P.C.

(57) ABSTRACT

An automotive driveline component has a housing and a shipping cap. The automotive driveline component can be a component of a power transfer unit (PTU), a final drive unit (FDU), a rear drive module (RDM), or a drive shaft. The housing has a wall that partly or more defines an opening. The opening is open to an exterior of the housing when the automotive driveline component is in an uninstalled state. The shipping cap can be temporarily secured in the opening. The shipping cap has a liquid collector for precluding residual lubricant in the housing from pooling at the opening. The liquid collector can be in the form of a sump, an absorbent material, or both.

19 Claims, 4 Drawing Sheets

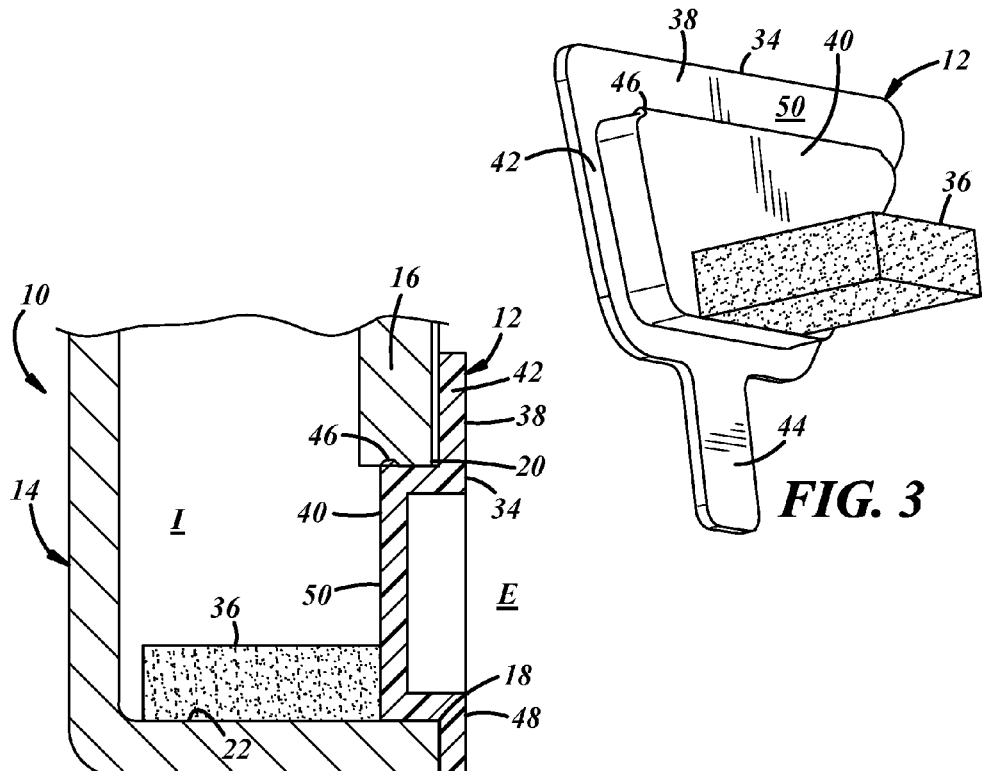
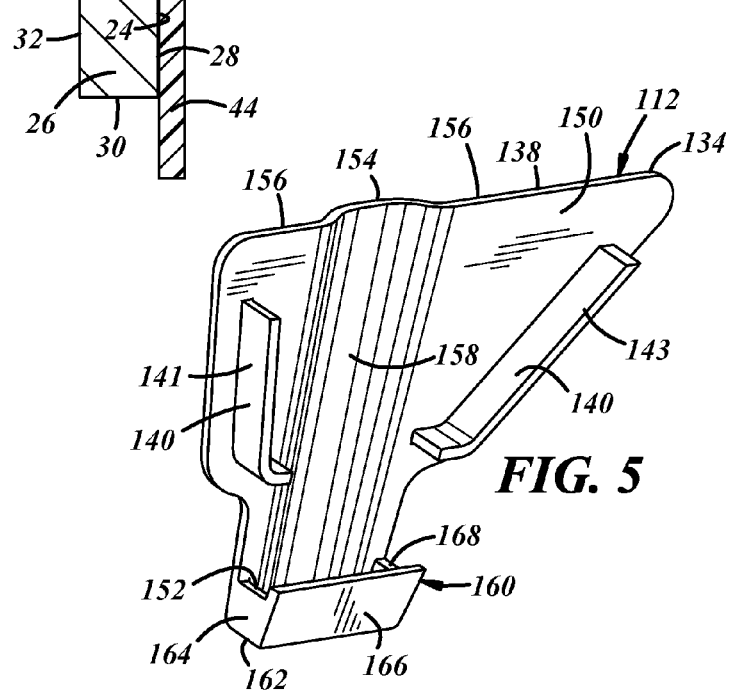
FIG. 3
FIG. 4
FIG. 5

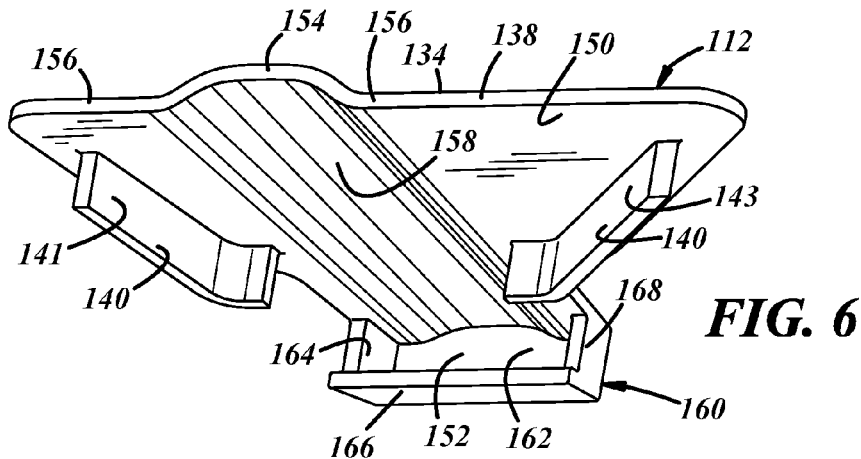
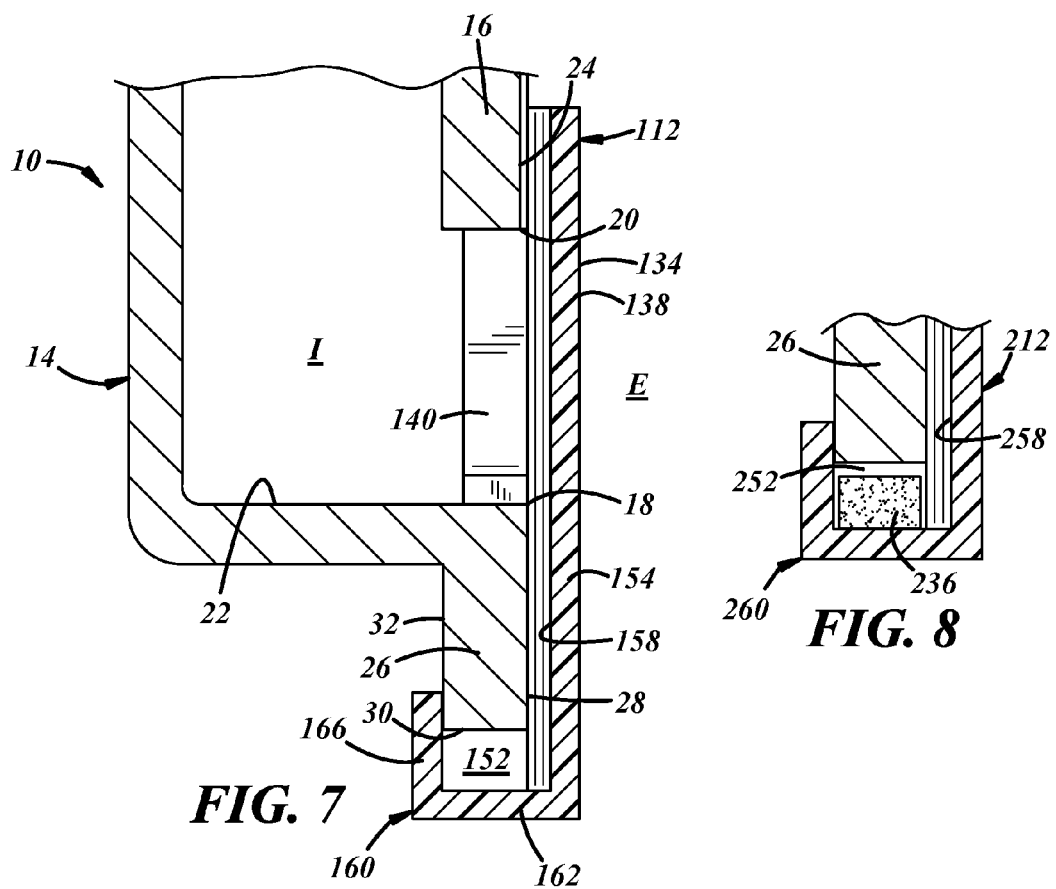

AUTOMOTIVE DRIVELINE COMPONENT WITH SHIPPING CAP

TECHNICAL FIELD

The present disclosure relates generally to automotive driveline components such as power transfer units (PTUs), final drive units (FDUs), rear drive modules (RDMs), and drive shafts, and relates more particularly to automotive driveline components that include shipping caps to close openings during shipment or at other times.

BACKGROUND

In general, automotive drivelines transmit torque from an engine and eventually to a set of wheels. Automotive drivelines, such as all-wheel drive (AWD) drivelines, sometimes include power transfer units (PTUs), final drive units (FDUs), rear drive modules (RDMs), and/or drive shafts to transmit the torque. The exact components in a particular automotive driveline often depends on the architecture of the overall driveline and the arrangement of the accompanying engine and transmission. The automotive driveline components typically have gears, shafts, bearings, and other items that are commonly lubricated when put in use in an automobile. Sometimes, before the automotive driveline components are supplied to the original equipment manufacturer (OEM) or to a supplier for installation and eventual use, the components are tested. The testing typically calls for lubrication to be supplied to an interior of the components and to any gears, shafts, bearings, and/or other items. The lubrication is usually drained from the automotive driveline components after the testing is completed and before the components are shipped to the original equipment manufacturer or supplier.

SUMMARY

In one implementation, an automotive driveline component may include a housing and a shipping cap. The housing may have a wall that partly or completely defines an opening. The opening may be open to an exterior of the housing when the automotive driveline component is in an uninstalled state. The shipping cap may be removably secured in the opening. The shipping cap may have a sump, at least a region of which is situated at a lower level than the opening with respect to an upright position of the automotive driveline component when the automotive driveline component is set for transit. When the automotive driveline component is in the upright position for transit, residual lubricant in the housing that makes its way to the opening may proceed to the sump of the shipping cap and may be retained therein.

In another implementation, an automotive driveline component may include a housing and a shipping cap. The housing may have a wall that partly or completely defines an opening. The opening may be open to an exterior of the housing when the automotive driveline component is in an uninstalled state. The shipping cap may be removably secured in the opening. The shipping cap may have a body and an absorbent material. The absorbent material may be carried by the body at an interior surface of the body. When the shipping cap is removably secured in the opening, a portion or all of the absorbent material may be situated within the opening at or near an inside surface of the housing. In this way, residual lubricant in the housing that makes its way to the opening may be absorbed by the absorbent material.

In yet another implementation, an automotive driveline component may include a housing and a shipping cap. The housing may have a wall that partly or completely defines an opening. The opening may be open to an exterior of the housing when the automotive driveline component is in an uninstalled state. The shipping cap may be removably secured in the opening. The shipping cap may have a liquid collector. The liquid collector may collect, and at least temporarily retain, residual lubricant that makes its way to the liquid collector.

BRIEF DESCRIPTION OF THE DRAWINGS

The following detailed description of preferred embodiments and best mode will be set forth with reference to the accompanying drawings, in which:

FIG. 3 is another perspective view of the shipping cap of FIG. 1;

FIG. 4 is a sectional view taken at lines 4-4 in FIG. 1, with the shipping cap secured to the RDM component;

FIG. 5 is a perspective view of another embodiment of a shipping cap that can be used with the RDM component of FIG. 1;

FIG. 6 is another perspective view of the shipping cap of FIG. 5;

FIG. 7 is a sectional view, similar to that of FIG. 4, of the shipping cap of FIG. 5 secured to the RDM component of FIG. 1;

FIG. 8 is a partial sectional view of another embodiment of a shipping cap that can be used with the RDM component of FIG. 1.

DETAILED DESCRIPTION OF PREFERRED EMBODIMENTS

Referring in more detail to the drawings, an automotive driveline component 10 is equipped with a shipping cap 12 when the automotive driveline component 10 is being prepared for shipping and transit. The shipping cap 12 is designed and constructed to preclude residual lubricant from spilling out of the automotive driveline component 10 when the shipping cap 12 is removed, or when the automotive driveline component 10 is in transit. A fluid collector such as a sump, an absorbent material, or both of these items, collects and at least temporarily retains residual lubricant that might otherwise flow or leak out of an opening of the automotive driveline component 10. The automotive driveline component 10 can be a component of a power transfer unit (PTU), a final drive unit (FDU), a drive shaft, or, as presented in the example of FIG. 1, a clutch assembly for use with a rear drive module (RDM). In this regard, the phrase "automotive driveline component" is used in a broad sense to embrace PTUs, FDUs, drive shafts, RDMs, and subassemblies thereof.

Figure 1:
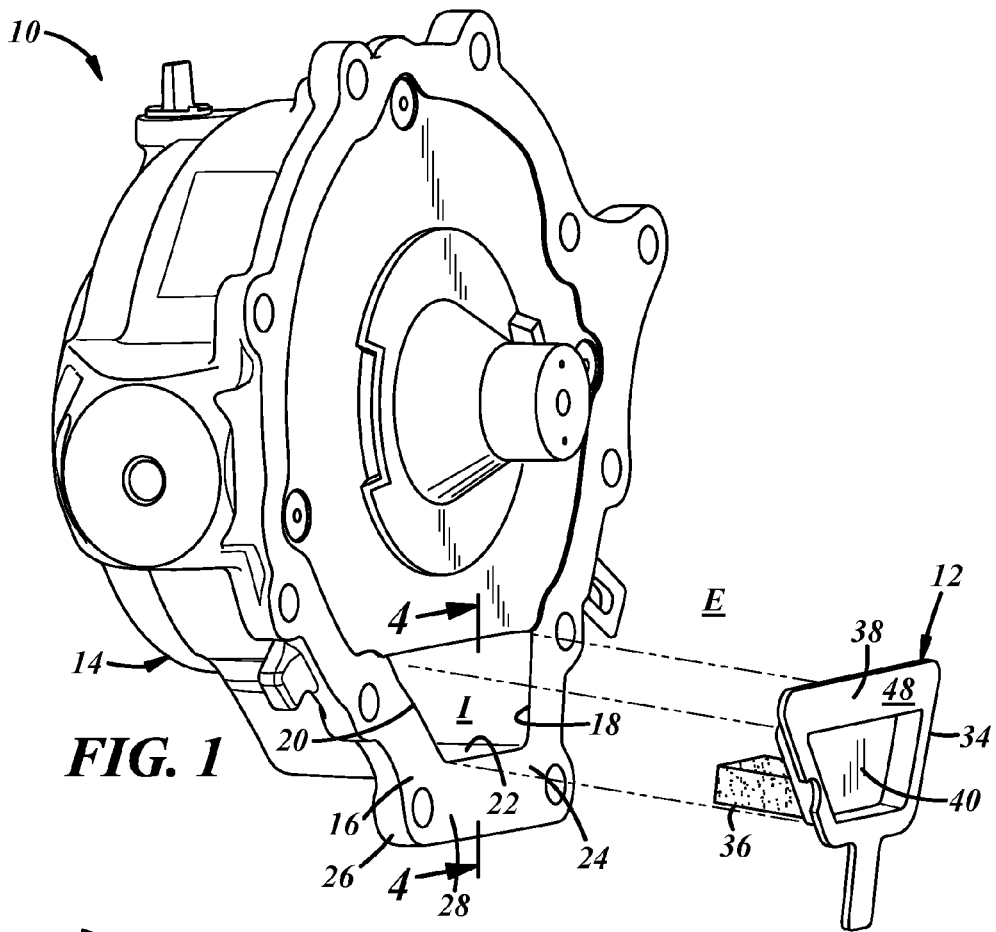
FIG. 1 is a perspective view of an example rear drive module (RDM) component with an embodiment of a shipping cap shown exploded from the RDM component.

Referring now particularly to FIG. 1, the automotive driveline component 10 is what is referred to as a pod-style RDM component. The pod-style RDM component, or clutch assembly, in this example can be equipped with a clutch mechanism in its interior and, in assembly and installation, is mounted to another RDM component (not shown) in order to make the larger rear drive module for an automotive driveline. When installed together, the pod-style RDM component and the companion RDM component can have shared lubrication systems. The automotive driveline component 10 is shown in an uninstalled state in which it is not mounted to its companion RDM component.

The automotive driveline component 10 includes a housing 14 to support internal components such as the clutch mechanism and to mount with the companion RDM component. In this example, the housing 14 has a wall 16. The wall 16 could be made up of discrete structures and could include a cover structure and a partition structure. The wall 16 defines part of, or all of, an opening 18 that may reside at or near a lowermost region of the housing 14. The term lowermost is used with respect to an upright position of the automotive driveline component 10, which is depicted in FIG. 1. The automotive driveline component 10 can be set in the upright position when it is prepared for shipment and in transit or at other times. The opening 18 is open to an exterior E of the automotive driveline component 10 when the component 10 is in its uninstalled state. When mounted to the companion RDM component, the opening 18 can communicate with another opening of the companion component, or can receive another component. The opening 18 has a periphery 20 and leads to an interior I of the housing 14. At the interior I, the wall 16 has an inside surface 22, and at the exterior E, the wall 16 has an outside surface 24 (inside and outside surfaces 22, 24 are also depicted in FIG. 4). In this example, the wall 16 has a flange 26, and the wall's outside surface 24 includes a frontside surface 28, an underside surface 30, and a backside surface 32.

The automotive driveline component 10 can be manufactured and assembled in one place, and then shipped to another place such as to a customer (e.g., OEM, supplier) for subsequent installation. It is not uncommon for an automotive driveline component, like the pod-style RDM component of FIG. 1, to be tested before being shipped in order to ensure that the component is in working order and that it satisfies performance demands. The testing typically calls for lubrication to be supplied inside of the automotive driveline component and to any gears, shafts, bearings, and/or other items, and, in the case of the pod-style RDM component, to its clutch mechanism. After testing, the lubricant can be drained out of the automotive driveline component. The automotive driveline component is then ready to be shipped to the customer.

In the example of the pod-style RDM component of FIG. 1, the automotive driveline component can be shipped in the upright position of FIG. 1, or can be upright at other times. It has been found that residual lubricant—that which remains after draining due to adherence to internal items of the automotive driveline component or that remains for other reasons—can migrate toward the lowermost region due to gravity and, it is believed, vibrations experienced during shipping. The residual lubricant, if it finds its way to the opening, could then exit the opening and escape out of the automotive driveline component. This leakage, if it occurs, is not always acceptable. In the past, dust covers and plugs were inserted into openings to block or hold leakage. But the dust covers and plugs sometimes merely served as a temporary barrier to residual lubricant that had pooled up behind the cover/plug and which would then spill out of the opening once the cover/plug was removed.

In order to resolve these drawbacks, the shipping cap 12 is designed and constructed to not only block or prevent residual lubricant leakage from the opening 18, but to also collect and at least temporarily retain residual lubricant and preclude the lubricant from spilling out of the automotive driveline component 10 upon removal of the shipping cap 12. The shipping cap 12 can have different designs and constructions depending upon, among other influences, the opening into which the shipping cap will be secured. In the embodiment of FIGS. 1-4, the shipping cap 12 is designed and constructed for use with the pod-style RDM component of FIG. 1. The shipping cap 12 has a body 34 and an absorbent material 36.

A portion of the body 34 is inserted into the opening 18 in order to secure the shipping cap 12 therein. The securement made is not permanent, as the shipping cap 12 is meant to be removed before the automotive driveline component 10 is installed with its companion RDM component. The body 34 can be composed of a plastic material so that it is more readily inserted into, and removed from, the opening 18. In the embodiment presented here, the body 34 has an exterior wall 38 and an interior wall 40. The exterior wall 38 can constitute the portion of the body 34 that may remain mostly, or entirely, outside of the opening 18 when the shipping cap 12 is secured in the opening 18. The interior wall 40, on the other hand, can constitute the portion of the body 34 that is inserted into the opening 18 and into the interior I. The exterior wall 38 forms a flange 42 and a handle 44. The flange 42 spans around the periphery 20 and abuts against the frontside surface 28 in order to obstruct any residual lubricant that might otherwise leak out from the opening 18. The handle 44 may extend beyond the housing (e.g., beyond a peripheral portion of the housing) and is meant to be grasped when removing the shipping cap 12 from the housing 14.

The interior wall 40 may include an inset portion that forms a cavity within the body 34, as perhaps illustrated best by FIG. 1. When the shipping cap 12 is secured, the interior wall 40 is inserted through the opening 18 and into the interior I of the automotive driveline component 10. In at least some implementations, a boundary of the interior wall 40 may closely follow and approximate the periphery 20 for a press-fit between the shipping cap 12 and the housing 14. The shipping cap 12 can have a lip 46 protruding out from one or more sides of the interior wall 40 that can aid in blocking residual lubricant and/or maintain a press-fit. At an exterior side, the body 34 has an exterior surface 48, and at an opposite interior side, the body 34 has an interior surface 50.

The absorbent material 36 takes-in residual lubricant and holds it, and precludes residual lubricant from settling and pooling at the interior I of the automotive driveline component 10 near the opening 18. The absorbent material 36 can be composed of a material that carries out this undertaking. Some examples of suitable materials for the absorbent material 36 include cellulose wood fibers and foamed plastic polymers. The precise material selected for the absorbent material 36 can be dictated by the type of lubricant utilized and the expected amount of residual lubricant that will settle near the opening 18.

Similarly, the precise design and construction of the absorbent material 36 can depend upon, among other factors, the shape and size of the opening 18 and the expected amount of residual lubricant that will settle near the opening 18. In the embodiment of FIGS. 1-4, the absorbent material 36 has a generally rectangular shape. At least a portion of the absorbent material 36 may be carried by the body 34 at the interior wall 40 and at the interior surface 50, and may extend therefrom. In one example, the absorbent material 36 can be carried by the body 34 via an adhesive, and in another embodiment presented by FIG. 9, the absorbent material 36 can be carried by the body 34 via an extension. As illustrated best by FIG. 4, the absorbent material 36 may extend from a lower region of the interior wall 40 so that the absorbent material 36 is situated at, and can rest against, a bottom section of the inside surface 22 where residual lubricant has a tendency to settle when the automotive driveline component 10 is in its upright position.

Figure 2:
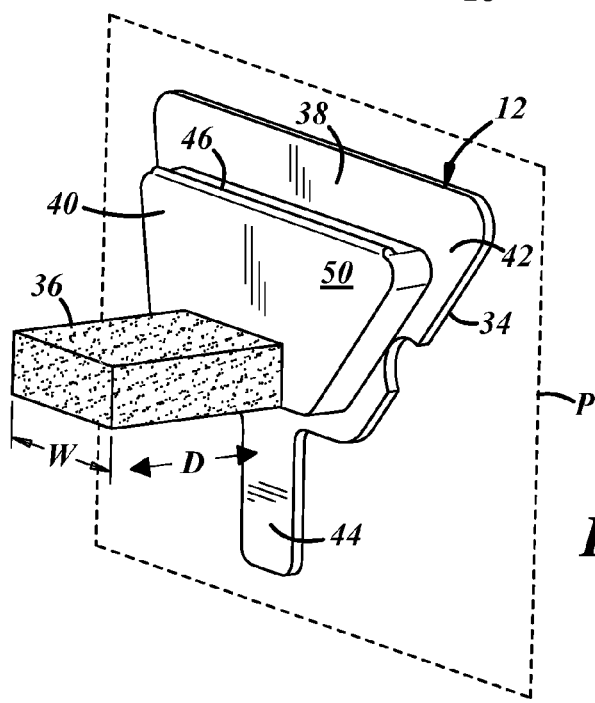
FIG. 2 is a perspective view of the shipping cap of FIG. 1.

Referring now particularly to FIG. 2, the rectangular shape of the absorbent material 36 is elongated in a direction D that is generally orthogonal to a primary plane P that the body 34 resides in. A width W of the absorbent material 36 can approximate a corresponding width of the opening 18 so that the absorbent material 36 is in place to take-in residual lubricant across the opening's width. And, referring now particularly to FIG. 4, since the absorbent material 36 extends from the interior wall 40, which is inset, the absorbent material 36 is situated entirely within the interior I when the shipping cap 12 is secured in the opening 18. Hence, residual lubricant absorbed by the absorbent material 36 remains within the interior I when the shipping cap 12 is secured in the opening 18.

When put in use, the absorbent material 36 is situated at the bottom section of the inside surface 22 and at least partially occupies the volume defined thereat. Residual lubricant that finds its way to the opening 18 and to the bottom section of the inside surface 22 is absorbed by the absorbent material 36. The residual lubricant is hence precluded from pooling up at the interior I behind the shipping cap 12. When the shipping cap 12 is subsequently removed from the opening 18, the residual lubricant absorbed by the absorbent material 36 is contained therein and carried away with the shipping cap 12. Residual lubricant is mostly, or fully, prevented from spilling or leaking out of the opening 18 upon removal of the shipping cap 12. After removal, the residual lubricant can be removed from the absorbent material 36 and the shipping cap 12 can be used again. Or, the absorbent material 36 can be unattached from the body 34 and replaced with a newer one. Furthermore, since the residual lubricant is contained within the absorbent material 36 instead of pooling, the residual lubricant is inhibited from leaking out of the opening 18 when the shipping cap 12 remains secured in the opening 18.

FIGS. 5-7 present another embodiment of a shipping cap 112 that can be used with the automotive driveline component 10. This embodiment is similar in some ways to the shipping cap embodiment of FIGS. 1-4, and the similarities may not be repeated in this description of FIGS. 5-7. Indeed, similar components in the embodiments of FIGS. 1-4 and FIGS. 5-7 have similar reference numerals, with the reference numerals of FIGS. 5-7 having the number 100 added to the reference numeral of the similar component in FIGS. 1-4.

In the embodiment of FIGS. 5-7, residual lubricant is collected and at least temporarily retained by a sump 152, instead of an absorbent material as in the previous embodiment. An exterior wall 138 of a body 134 has a recessed portion 154 and a non-recessed portion 156. The recessed portion 154 is a concavity formed at the interior side and in an interior surface 150 of the body 134. In this embodiment, the recessed portion 154 spans the full up-and-down extent of the body 134, though need not and could instead terminate short of a top side of the body 134. With respect to the orientation presented by FIGS. 5 and 6, the recessed portion 154 has a left-to-right width that is less than a width extent of the body 134. The recessed portion 154 defines a clearance 158 relative to a plane that the non-recessed portion 156 resides in. When the shipping cap 112 is inserted into the opening 18, the recessed portion 154 is set back a distance from the opening's periphery 20 and the clearance 158 is defined between the interior surface 150 and the periphery 20 and the frontside surface 28 of the flange 26. The sectional view of FIG. 7 is taken at an approximate mid-line of the clearance 158, and therefore the spacing that the recessed portion 154 is set back from the periphery 20 is depicted. The recessed portion 154 spans down to the sump 152 and communicates therewith—in this way, the clearance 158 serves as a chute and passage for conveying residual lubricant at the opening 18 down to the sump 152. Unlike the recessed portion 154, the non-recessed portion 156 abuts the periphery 20 and the outside surface 24 when the shipping cap 112 is inserted into the opening 18.

An interior wall 140 in this embodiment is divided into a first segment 141 and a second segment 143, though need not be and instead could be a continuously-extending wall that closely follows and approximates the periphery 20. The first and second segments 141, 143 may serve to form a press-fit between the shipping cap 112 and the housing 14.

The sump 152 receives and contains residual lubricant that finds its way out of the opening 18, and precludes residual lubricant from settling and pooling at the interior I of the automotive driveline component 10 and near the opening 18. The received lubricant is caught and stays within the sump 152. At least a part of the sump 152 is situated at a lower level than the opening 18 when the automotive driveline component 10 is in its upright position, as depicted in FIG. 7. Residual lubricant, hence, readily flows into the sump 152 via the clearance 158 due to gravity. In this embodiment, the sump 152 is situated directly underneath the flange 26 and underneath the underside surface 30. In other embodiments, the sump 152 could have other locations; for instance, the sump need not be located underneath a flange and instead could be located beside the opening 18 and without a clearance.

The sump 152 can have different designs and constructions for receiving residual lubricant. In the embodiment of FIGS. 5-7, the sump 152 has a trough-like shape and is defined at the interior of a cupped section 160 of the body 134. The cupped section 160 has a bottom wall 162, a first side wall 164, a second side wall 166, and a third side wall 168. Inside surfaces of the walls 162, 164, 166, and 168, along with the interior surface 150, define the boundaries of the sump 152. The side walls 164, 166, and 168 extend upward from the bottom wall 162.

To contain the received residual lubricant and prevent it from escaping the sump 152, surface-to-surface abutments can be made between the cupped section 160 and the flange 26. In this embodiment, a first surface-to-surface abutment is made between a top surface of the first side wall 164 and the underside surface 30. Similarly, a second surface-to-surface abutment is made between a top surface of the third side wall 168 and the underside surface 30. And a third surface-to-surface abutment is made between the inside surface of the second side wall 166 and the backside surface 32—this is depicted in FIG. 7. These surface-to-surface abutments can establish a seal against leakage. Still, in other embodiments the surface-to-surface abutments need not necessarily be made and/or other surface-to-surface abutments can be made; for instance, a top surface of the second side wall 166 and the underside surface 30 could make surface-to-surface abutment and establish a seal thereat.

When the shipping cap 12 is assembled to the housing 14, residual lubricant that finds its way to the opening 18 and to the bottom section of the inside surface 22 proceeds to the sump 152 via the clearance 158. The residual lubricant does not pool to any significant extent at the interior I behind the shipping cap 112. When the shipping cap 112 is removed from the opening 18, the residual lubricant caught in the sump 152 can remain in the shipping cap 112, if handled appropriately, and can be carried away with the shipping cap 112. Residual lubricant is mostly, or fully, prevented from spilling out of the opening 18 upon removal of the shipping cap 112. After removal, the residual lubricant can be emptied out of the sump 152 and the shipping cap 112 can be re-used. Furthermore, since the residual lubricant is contained within the sump 152 instead of pooling, the residual lubricant is inhibited from leaking out of the opening 18 when the shipping cap 112 remains secured in the opening 18.

FIG. 8 presents yet another embodiment of a shipping cap 212 that can be used with the automotive driveline component 10. This embodiment is similar in many ways to the shipping cap 112 of FIGS. 5-7, and the similarities may not be repeated in this description of FIG. 8. Indeed, similar components in the embodiments of FIGS. 5-7 and FIG. 8 have similar reference numerals, with the reference numerals of FIG. 8 having the number 100 added to the reference numeral of the similar component in FIGS. 5-7.

The embodiment of FIG. 8 is similar to the embodiment of FIGS. 5-7, except that an absorbent material 236 is situated within a sump 252. As described with reference to FIGS. 1-4, the absorbent material 236 absorbs residual lubricant and holds it at the sump 252. The absorbent material 236 can be composed of the same materials described above for the absorbent material 36. The absorbent material 236 can be attached to one of the inside surfaces of a cupped section 260 via an adhesive, and can somewhat tightly fit within the cupped section 260. The absorbent material 236 can fully occupy the sump 252, or can occupy only a partial region of the sump 252. As shown in the sectional view of FIG. 8, the absorbent material 236 can be fully enclosed within the sump 252.

Figure 9:
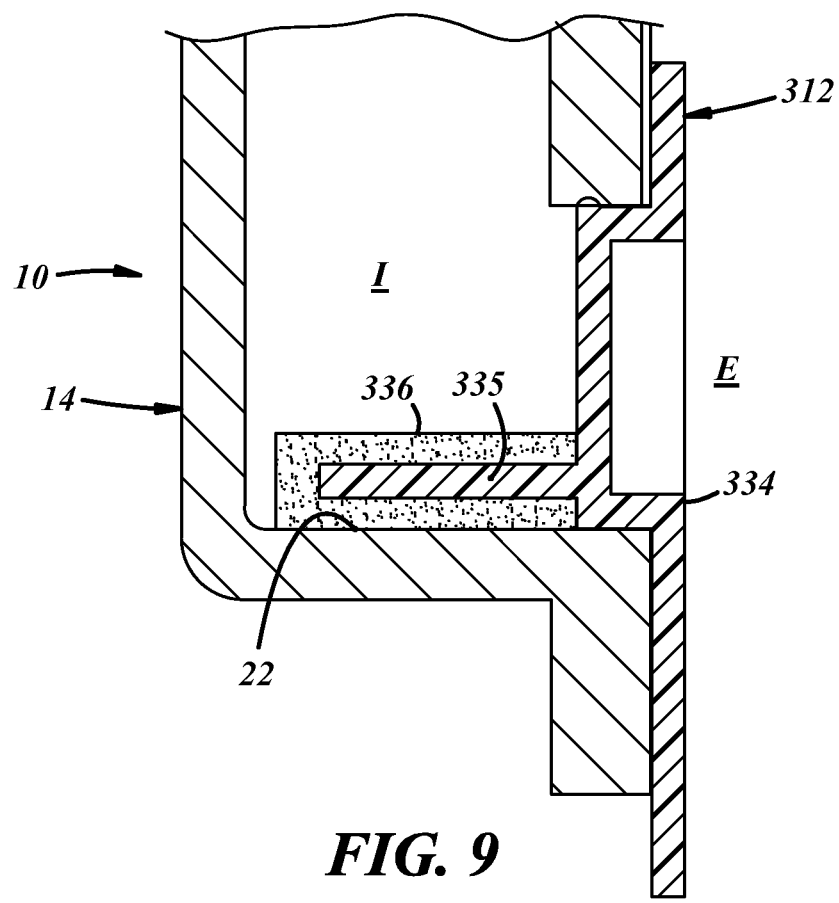
FIG. 9 is a sectional view, similar to that of FIG. 4, of another embodiment of a shipping cap that can be used with the RDM component of FIG. 1.

FIG. 9 presents yet another embodiment of a shipping cap 312 that can be used with the automotive driveline component 10. This embodiment is similar in some ways to the shipping cap 12 of FIGS. 1-4, and the similarities may not be repeated in this description of FIG. 9. Indeed, similar components in the embodiments of FIGS. 1-4 and FIG. 9 have similar reference numerals, with the reference numerals of FIG. 9 having the number 300 added to the reference numeral of the similar component in FIGS. 1-4.

In the embodiment of FIG. 9, an absorbent material 336 is carried by an extension 335 of a body 334. The extension 335 can be a unitary part of the body 334, or can be made discretely and subsequently attached to the body 334. As illustrated by FIG. 9, the absorbent material 336 may fully surround the extension 335 and is situated at, and rests against, the bottom section of the inside surface 22. In this embodiment, the absorbent material 336 can be slid over and removably carried by the extension 335, and need not be adhered thereto. In this way, the absorbent material 336 can be more readily removed and replaced if needed. Still, in other embodiments, other techniques for carrying and attaching the absorbent material are possible.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. An automotive driveline component, comprising:
   a housing with a wall at least partly defining an opening that is open to an exterior of said housing when the automotive driveline component is in an uninstalled state; and
   a shipping cap removably secured in said opening, said shipping cap having a sump, at least a region of said sump situated at a lower level than said opening with reference to an upright position of the automotive driveline component when the automotive driveline component is set for transit;
   wherein, when the automotive driveline component is in the upright position for transit, residual lubricant in said housing that flows out of said opening proceeds to said sump of said shipping cap and is retained therein.

2. The automotive driveline component as set forth in claim 1, wherein said shipping cap has an exterior wall and an interior wall, said exterior wall is located outside of said opening of said housing when said shipping cap is removably secured in said opening, and said interior wall is inserted into said opening and is located at least partly around a periphery of said opening.

3. The automotive driveline component as set forth in claim 1, wherein said shipping cap has an exterior wall with a recessed portion situated away from a periphery of said opening and at least partly defining a clearance with respect to said periphery, said clearance leading to said sump, and residual lubricant in said housing that flows out of said opening proceeds to said sump via said clearance.

4. The automotive driveline component as set forth in claim 3, wherein said exterior wall has a non-recessed portion at least closely abutting said periphery of said opening.

5. The automotive driveline component as set forth in claim 1, wherein said sump is at least partly defined by a cupped section of said shipping cap, said cupped section having a bottom wall and at least one side wall.

6. The automotive driveline component as set forth in claim 1, wherein said sump is at least partly defined by at least one side wall that makes surface-to-surface abutment with said wall of said housing in order to contain residual lubricant within said sump.

7. The automotive driveline component as set forth in claim 1, wherein said sump is at least partly defined by a bottom wall and at least one side wall, said at least one side wall making surface-to-surface abutment with a backside surface of said wall of said housing in order to contain residual lubricant within said sump.

8. The automotive driveline component as set forth in claim 7, wherein at least a region of said sump is situated underneath an underside surface of said wall of said housing.

9. The automotive driveline component as set forth in claim 1, wherein said sump is at least partly defined by a first side wall, a second side wall, and a third side wall, said first side wall making surface-to-surface abutment with a backside surface of said wall of said housing, and said second and third side walls making surface-to-surface abutment with an underside surface of said wall of said housing, the surface-to-surface abutments serving to contain residual lubricant within said sump.

10. The automotive driveline component as set forth in claim 1, wherein said shipping cap includes an absorbent material disposed within said sump in order to absorb residual lubricant in said sump.

11. The automotive driveline component as set forth in claim 1, wherein said sump is situated wholly below a lowermost periphery of said opening with reference to an upright position of the automotive driveline component when the automotive driveline component is set for transit.

12. The automotive driveline component as set forth in claim 1, wherein the automotive driveline component is a clutch assembly of a rear drive module (RDM) component.

13. An automotive driveline component, comprising:
 a housing with a wall at least partly defining an opening that is open to an exterior of said housing when the automotive driveline component is in an uninstalled state; and
 a shipping cap removably secured in said opening, said shipping cap having a body and an absorbent material carried by said body at an interior surface of said body, when said shipping cap is removably secured in said opening at least a portion of said absorbent material is situated at or adjacent an inside surface of said housing in order to absorb residual lubricant in said housing that makes its way to said opening.

14. The automotive driveline component as set forth in claim 13, wherein said body includes an exterior wall and an interior wall, said exterior wall is located outside of said opening of said housing when said shipping cap is removably secured in said opening, said interior wall is inserted into said opening and is located at least partly around a periphery of said opening.

15. The automotive driveline component as set forth in claim 13, wherein, when said shipping cap is removably secured in said opening, said absorbent material is set back a distance from a periphery of said opening and is situated within an interior of said housing.

16. The automotive driveline component as set forth in claim 13, wherein said absorbent material is elongated in a direction generally orthogonal to a primary plane that said body of said shipping cap resides in.

17. An automotive driveline component, comprising:
 a housing with a wall at least partly defining an opening that is open to an exterior of said housing when the automotive driveline component is in an uninstalled state; and
 a shipping cap removably secured in said opening, said shipping cap having a liquid collector, said liquid collector collecting and at least temporarily retaining residual lubricant that makes its way to said liquid collector.

18. The automotive driveline component as set forth in claim 17, wherein said liquid collector is a sump, at least a region of said sump is situated at a lower level than said opening with reference to an upright position of the automotive driveline component when the automotive driveline component is set for transit.

19. The automotive driveline component as set forth in claim 17, wherein said liquid collector is an absorbent material carried by a body of said shipping cap, when said shipping cap is removably secured in said opening at least a portion of said absorbent material is situated at or adjacent an inside surface of said housing in order to absorb residual lubricant in said housing that makes its way to said absorbent material.

* * * * *